US009053366B2

(12) United States Patent
Us et al.

(10) Patent No.: US 9,053,366 B2
(45) Date of Patent: Jun. 9, 2015

(54) SYSTEM AND METHOD FOR DETECTING MOTION IN COMPRESSED VIDEO

(71) Applicant: Honeywell International Inc., Morristown, NJ (US)

(72) Inventors: Yadhunandan Us, Andhra Pradesk (IN); Gurumurthy Swaminathan, Karnataka (IN); Kwong Wing Au, Bloomington, MN (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 120 days.

(21) Appl. No.: 13/772,012

(22) Filed: Feb. 20, 2013

(65) Prior Publication Data
US 2014/0233792 A1  Aug. 21, 2014

(51) Int. Cl.
*G06K 9/00* (2006.01)
*H04N 19/503* (2014.01)
*H04N 19/176* (2014.01)
*H04N 19/48* (2014.01)

(52) U.S. Cl.
CPC .......... *G06K 9/00624* (2013.01); *H04N 19/503* (2014.11); *H04N 19/176* (2014.11); *H04N 19/48* (2014.11)

(58) Field of Classification Search
None
See application file for complete search history.

(56) References Cited

U.S. PATENT DOCUMENTS

| 5,644,361 | A * | 7/1997 | Ran et al. | 375/240.16 |
|---|---|---|---|---|
| 6,449,392 | B1 * | 9/2002 | Divakaran et al. | 382/235 |
| 6,671,319 | B1 * | 12/2003 | Chang et al. | 375/240.16 |
| 8,223,843 | B2 * | 7/2012 | Lee et al. | 375/240.16 |
| 2005/0152449 | A1 * | 7/2005 | Nemiroff et al. | 375/240.03 |
| 2008/0181308 | A1 * | 7/2008 | Wang et al. | 375/240.16 |
| 2010/0245670 | A1 * | 9/2010 | Takeda et al. | 348/607 |
| 2011/0200093 | A1 * | 8/2011 | Gabara et al. | 375/240.01 |

FOREIGN PATENT DOCUMENTS

| EP | 1 021 042 A1 | 7/2000 |
|---|---|---|
| EP | 1 333 682 A1 | 8/2003 |

OTHER PUBLICATIONS

Video Compression Based on Moving Regions, Department of Computer Engineering, Airoli, Navi Mumbai, ISSN: 0975-9646, International Journal of Computer Science and Information Technologies, vol. 3 (6), 2012, 5304-5307, S.D. Sawarkar, Preeti Prasada.*

(Continued)

*Primary Examiner* — Bernard Krasnic
*Assistant Examiner* — Pinalben Patel
(74) *Attorney, Agent, or Firm* — Husch Blackwell LLP

(57) ABSTRACT

A method and apparatus wherein the method includes the steps of parsing a stream of compressed video, obtaining macroblock size information from the parsed stream, computing factors derived from the macroblock size, wherein the factors include a normalized bit size, a bit size ratio and a neighbor score, computing corresponding adaptive threshold values derived from the relative frame characteristics of the compressed video, comparing the factors derived from the macroblock size information with the corresponding adaptive threshold values and detecting motion based upon combinations of the comparisons when the factors exceed the threshold value.

14 Claims, 1 Drawing Sheet

(56) References Cited

OTHER PUBLICATIONS

ViBE: A New Paradigm for Video Database Browsing and Search; Video and Image Processing Laboratory, School of Electrical Engineering and Computer Engineeting, Purdue University, West Lafayette, IN 47907-1285; IEEE Workshop on Content-based Access of Image and Video Libraries, pp. 960100, Santa Barbara, CA, Jun. 21, 1998, Jau-Yuen Chen, Edward Delp.*
Houari Sabirin and Gero Bäse (2011). Video Surveillance of Today: Compressed Domain Object Detection, ONVIF Web Services Based System Component Communication and Standardized Data Storage and Export using VSAF—a Walkthrough, Video Surveillance, Prof. Weiyao Lin (Ed.), ISBN: 978-953-307-436-8, InTech, Available from: http://www.intechopen.com/book.*
Moving Object Detecton in H.264/AVC compressed domain for video surveiilance applications, Chris Poppe, J. Vis. Comm. Image R. 20 (2009), 428-437.*
Chris Poppe et al., "Moving Object Detection in the H.264/AVC Compressed Domain for Video Surveillance Applications", J. Vis. Commun. Image R, vol. 20, pp. 428-437, 2009.
Antoine Vacavant et al., Adaptive Background Subtraction in H.264/AVC Bitstreams Based on Macroblock Sizes, VISAPP-2011, 51-58.
C. Solana-Cipres et al., "Real-Time Moving Object Segmentation in H.264 Compressed Domain Based on Approximate Reasoning," International Journal of Approximate Reasoning, vol. 51, 99-114, 2009.
Krzysztof Szczerba et al., Technical University of Demark and Jesper Stottrup-Andersen et al., Milestone Systems A/S, "Fast Compressed Domain Motion Detection in H.264 Video Streams for Video Surveillance Applications," Advanced Video and Signal Based Surveillance, 2009.
Zhi Liu et al., "Real-Time Spatiotemporal Segmentation of Video Objects in the H.264 Compressed Domain," Journal of Visual Communication and Image Representation, vol. 18, pp. 275-290, 2007.
Changfeng Niu et al., "Moving Object Segmentation Based on Video Coding Information in H.264 Compressed Domain," Image and Signal Proeessing, 2009. CISP '09, 2nd International Congress, pp. 1-5.
Pei Wang et al., "Block Characteristic Based Moving Object Segmentation in the H.264 Compressed Domain," Audio Language and Image Processing (ICALIP), 2010 International Conference, pp. 643-647, Nov. 2010.
Zhi Liu et al., "Moving Object Segmentation in the H.264 Compressed Domain," Optical Engineering, 46(1), 017003, Jan. 2007.
Sarah De Bruyne et al., "Estimating Motion Reliability to Improve Moving Object Detection in the H.264/AVC Domain,", Multimedia and Expo, IEEE International Conference, pp. 330-333, Jul. 2009.
European Search Report for corresponding EP application 14153707.6, dated Apr. 14, 2014.
European Opinion of Search Report for corresponding EP application 14153707.6, dated Apr. 14, 2014.
Jian Feng et al., "Scene Change Detection Algorithm for MPEG Video Sequence," Proceedings of the International Conference on Image Processing (ICIP) Lausanne, Sep. 16 to 19,1996, pp. 821-824, vol. 1, New York, NY, U.S.A.
Feng Jie et al., "A Novel Scene Change Detection Algorithm for H.264/AVC Bitstreams," Computational Intelligence and Industrial Application 2008, PACIIA '08, Pacific Asia Workshop on, Dec. 19, 2008, pp. 712-716, Piscataway, NJ, U.S.A.

* cited by examiner

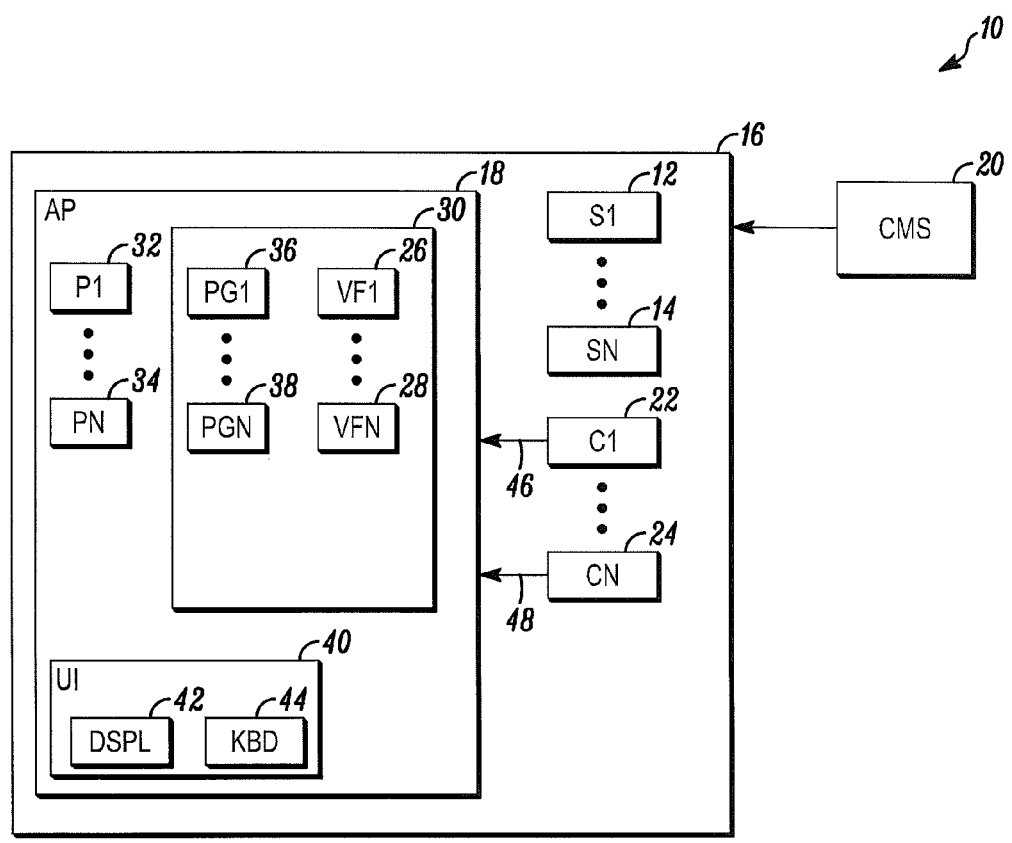

SYSTEM AND METHOD FOR DETECTING MOTION IN COMPRESSED VIDEO

FIELD

The field relates to video cameras and more particularly to detecting motion in a field of view of video cameras.

BACKGROUND

Security systems that detect intruders via one or more security cameras are generally known. Such systems may be based upon the use of a security guard that monitors the cameras for intruders and raises an alarm when he/she notices an intruder.

In other security systems, the detection of intruders is automatic. In such systems, the detection of intruders may be based upon the detection of motion within a field of view of a camera. In such systems, a computer is generally used to compare successive frames of video for changes between the successive frames. When a change of sufficient magnitude is detected and is recognized as ah object of interest, e.g., a human, the computer alerts a security guard or central monitoring station.

In order to reduce costs, most security systems have only a single, central location that monitors for and that detects intruders. Where a secured area extends over a large geographic expanse (e.g., an airport), the bandwidth of bringing all video signals back to the monitoring location for the detection of motion is prohibitively large. In order to reduce bandwidth, video signals may be compressed for transmission using an appropriate compression algorithm (e.g., H.264).

However, processing the compressed video signal at the monitoring station is also problematic in terms of interpretation, e.g., detection of intruder. State-of-the-art intruder detection systems work in the uncompressed pixel domain. Therefore, the compressed video signal must be decompressed before the intruder detection algorithms may be applied. Decompression is a time consuming process; it often prevents real-time operation, such as motion detection used for intruder detection unless multiple, expensive processors are used. Accordingly, a need exists for a better method of processing compressed video signals at the monitoring station.

BRIEF DESCRIPTION OF THE DRAWING

FIG. 1 is a block diagram of a security system in accordance with an illustrated embodiment.

DETAILED DESCRIPTION OF AN ILLUSTRATED EMBODIMENT

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Shown within the security system 10 is a number of sensors 12, ..., 14 used to detect events within a secured area 16. The sensors may be switches coupled to portals of the secured area (e.g., doors, windows, etc.). Alternatively, the sensors may be environmental detectors (e.g., smoke detectors, gas detectors, etc.).

The status of the sensors may be monitored a security system control station 18. In the event one or more of the sensors is activated, the control panel 18 may send an alarm message to a central monitoring station 20.

The security system may also include one or more cameras 22, ..., 24, which transmit the video images via wired or wireless links 46, ... 48. Video from the cameras may be received by the control station 18 and saved in one or more video files 26, ..., 28 located within a non-transitory computer readable medium (memory) 30.

The security system may also include one or more processing apparatus (processors) 32, ..., 34. The processors operate under control of one or more computer programs 36, ..., 38 loaded from a non-transitory computer readable medium (memory) 30. As used herein, reference to a step performed by a computer program is also a reference to the processor that executed that step.

During normal operation, a human operator may view video from the cameras through a display 42 on a user interface 40. The operator may select a camera for viewing by entering an identifier of a camera through a keyboard or touchscreen 44 and via operation of a camera control processor.

In order to reduce the bandwidth necessary to transmit image frames from the cameras 22, 24, a programmed processor within each of the cameras may compress the video using an appropriate codec (e.g., H.264/MPEG-4). In order to view images from the cameras, a decoding processor may decode the compressed video images for presentation on the display 42. The compressed video may simply be saved into a video file.

Under the illustrated embodiment, the compressed data is continuously processed in a compressed state in order to detect motion in a selected field of view of at least some of the cameras. In prior systems, in order to detect motion, the compressed video data needed to be partially or completely decoded before motion could be detected. However, the decompression of compressed data requires a significant amount of computer processing and is therefore expensive.

One solution to the problem of detecting motion in compressed data has been to process motion vectors that are already computed in the compressed data. The computed motion vectors are developed for efficient compression, not for motion detection. However, the processing of motion vectors is still time consuming and expensive.

In contrast, the system 10 uses macroblock size information for detecting motion. Macroblock size information can be easily extracted from the compressed stream from each camera without imposing significant computational costs on the system 10. However, macroblock size alone may not be a reliable factor for motion detection because a number of other factors may influence the number of bits used for coding the macroblock. In order to accurately detect motion, the system described below uses a number of mechanisms to normalize the macroblock bit information.

As such, the motion detection system described below can detect motion in the compressed domain directly from the incoming video stream (e.g., H.264/MPEP-4) without fully decoding the stream. Since the video is not fully decoded, the computational cost is much less and more video streams can be analyzed for motion with the same processing power. The motion detection system can also be used for the detection of motion in stored compressed video thereby generating the analysis results much faster.

In general, motion detection in the compressed video domain is accomplished using the size (number of bits) of the macroblock as the main feature. Three different motion detection methods may be implemented using the size of the macroblock. These methods are explained in detail below.

Under one illustrated embodiment, various combinations of three motion detection methods are used by one or more programmed motion detection processors to detect motion. The method used may be determined from the frame characteristics of the video stream wherein the frame characteristics may be determined from one or more of average Macro Block (MB) size, median MB size in the frame, most often occurring MB size, histogram of MB size in the frame, etc. One or more adaptive thresholds may be computed from the frame characteristics.

The three methods can be implemented using various combinations of steps including, first, the video is parsed to obtain the frame level and MB level information. Second, quantization normalization is used to obtain normalized MB size information and, third, the presence of motion in each MB is determined. This, third step, can be done using the MB size information under two different methods. The presence of motion in each MB under the first method can be determined by computing the ratio associated with a current MB size by using the same MB in two adjacent i-frames (past and future). If the ratio is greater than a Ratio Threshold (RT) value then the MB is marked as having motion. Alternatively, the presence of motion under a second method can be determined by comparing the MB size directly against a Bit Threshold (BT). If the MB is greater than BT then the MB is marked as having motion.

The third step may also require a fourth step. The fourth step may include performing spatio-temporal filtering on the motion MBs identified. This may be needed to remove the holes and missing regions in a moving object.

The second step of applying quantization normalization will be discussed next. In this regard, the quantization is used to reduce the size (number of bits) of the MB residual error based on the chosen level of compression or chosen level of bitrates. The MB size extracted from the uncompressed stream is that of the quantized MB bitstream, which may not give the full extent of the residual error of the MB. To recover the original bitsize of the MB residual error, the processor applies the quantization process in a reverse format including, for each non-zero element, finding the original element size before quantization. The steps performed by the normalization processor may be characterized by the equation that follows.

MB original size in bits
$= \text{MB size}_{compressed} + \log_2(\text{quantization index})$
$* \text{number\_of\_non\_zero\_elements\_MB}$
,
where
Quantization index
$= \text{QP\_table(quantization\_parameter)} * 2^{floor(quantization\_para/6)}$
.

The first detection method of motion using the ratio threshold will be discussed in more detail next. In this regard, the MB of an i-frame is intra coded, i.e. the MB is predicted from neighbors from its right side and the error is coded with DCT. Since the MB is predicted from its neighborhood, the chances are that the match will not be very good and, therefore, the error will be greater and the size of coded MB will (in turn) be greater. Whereas in a normal p-frame, the MB is inter coded, i.e. predicted from an adjacent frame (past or future), in which case the chances of getting a good match is greater and the coded MB will, therefore, be smaller in size. The idea here is that the i-frame intra coding of an MB is considered the worst case scenario when a non-optimal match is found. This can only happen in the case of p-frame inter coding when there is a new object or motion present in the MB.

The steps in motion detection using the RT method include: first, store the size info of each MB in two successive i-frames, where for all the p-frames present in between these i-frames the stored info will be used for motion detection. Second, in the p-frame for each MB, compute the ratios between the current p-frame MB size and the stored size info of the same MB in the two i-frames (past, future). Third, if at least one of the two bit size ratios is greater than the Ratio Threshold (RT) then the MB is probably affected by motion, and, fourth, the identified MB's size are compared with a Bit Threshold (BT). If the MB is greater than BT, then the MB contains motion.

Finally, if some of the MBs in the i-frame which are intra-predicted don't have AC components (otherwise indicating a good match with surrounding left-top MB's), such MBs will have significantly smaller size. As such, it will be incorrect to use such MBs for comparison using the RT method. In such cases only BT is used for motion detection.

The method of MB motion detection using the bit threshold will be discussed next. The computation in this method is similar as described above with the exception that only the Bit Threshold is used to find the presence and absence of motion in the MB. The steps in motion detection using the BT method include, in the p-frame for each MB compare the current p-frame MB size with the Bit Threshold (BT). If the MB is greater than the BT, then the MB contains motion.

The method of MB detection using spatio-temporal filtering and another adaptive threshold will be discussed next. In this regard, there is a chance that some MBs are not detected as motion MBs due to the presences of very small changes or due to reasons such as getting near perfect matches (in intra-prediction), thereby, reduced the MB size in the i-frame, etc. Most of such cases are observed to occur in the inside portion (mid-portion) of the moving object, as the edge MB's are mostly identified as motion. Such MBs are called holes which can be regained using morphological operations along the spatial and temporal axis, which is referred as spatio-temporal filtering. The steps in spatio-temporal filtering include, first, in the given frame for each non-motion MB compute the number of motion MBs present in its 8-connected neighborhood, which will be called a neighborhood score. The second step identifies all the non-motion MBs whose neighborhood scores are bigger or equal to 4. These MBs are then marked as motion MB's. Third, identify all the non-motion MBs whose neighborhood scores are 3. Refer to this set of MBs as {MB 3}. For all MBs in {MB 3} retrieve their neighborhood scores in the previous (past) two frames. Finally, mark a MB in {MB 3} as motion MB, when its two previous neighborhood scores are at least 5. This will be the spatio-temporal filtering method.

Once the stream is processed, the number of motion MBs may be compared with a threshold value. If the number exceeds the threshold, then motion is detected.

Upon detection of motion by the one or more motion detection processors, the detecting processor may send an alert to the alarm processor. The alarm processor may, in turn, alert the human operator or send an alarm message to the central monitoring station.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
   parsing a stream of compressed video;
   obtaining macroblock size information from a frame of compressed video within the parsed stream;
   computing factors derived from the macroblock size, wherein the factors include a normalized bit size, a bit size ratio and a neighborhood score;
   computing corresponding adaptive threshold values derived from the relative frame characteristics of the compressed video;
   comparing the factors derived from the macroblock size information with the corresponding adaptive threshold values;
   detecting motion based upon combinations of the comparisons when the factors exceed the threshold value;
   spatio-temporally filtering non-motion macroblocks of inside portions of moving objects where edges of the moving objects include moving macroblocks;
   for each non-motion macroblock computing a neighborhood score defined by the number of motion macroblocks present in its 8-connected neighborhood, identifying all the non-motion macroblocks which have at least 4 motion macroblocks in its 8-connected neighborhood and marking the non-motion macroblock as a motion macroblock, and
   identifying all the non-motion macroblocks which have neighborhood scores of n and for such macroblocks retrieving their neighborhood scores in a previous two frames, marking all macroblocks as motion macroblocks which have a neighborhood score of at least m in both previous frames and detecting motion by comparing the neighborhood score of the motion macroblocks with neighbor score threshold values, m, n of the computed corresponding adaptive threshold values.

2. The method as in claim 1 wherein computing the bit size ratio further comprises providing a size value for each i-frame macroblock in two successive i-frames of the parsed stream and providing a size value of each p-frame macroblock corresponding to each i-frame macroblock of the two successive i-frames.

3. The method as in claim 2 wherein computing the bit size ratio further comprises determining a ratio between each i-frame macroblock and corresponding p-frame macroblock.

4. The method as in claim 3 wherein comparing of the factors derived from the macroblock size information with the corresponding adaptive threshold values further comprises comparing the determined ratios with a ratio threshold value of the computed corresponding adaptive threshold values.

5. The method as in claim 4 wherein detecting motion based upon combinations of the comparisons when the factors exceed the threshold value further comprises detecting motion when at least one of the computed ratios exceeds the ratio threshold value.

6. The method as in claim 1 further comprising using only the normalized bit size for detecting motion when intra-predictive i-frame macroblocks of the parsed stream are substantially free of AC components.

7. The method as in claim 1 wherein detecting motion based upon combinations of the comparisons when the factors exceed the threshold value further comprises comparing a current p-frame macroblock bit size with a bit threshold value and detecting motion when the current p-frame macroblock bit size exceeds a bit threshold value of the computed corresponding adaptive threshold values.

8. An apparatus comprising:
   a parsing processor that parses a stream of compressed video;
   a macroblock size processor that obtains macroblock size information from a frame of compressed video within the parsed stream;
   a computing processor that computes a set of factors derived from the macroblock size, wherein the factors include a normalized bit size, a bit size ratio and a neighborhood score;
   a threshold processor that computes corresponding adaptive threshold values derived from the relative frame characteristics of the compressed video;
   a comparison processor that compares the factors derived from the macroblock size information with the corresponding adaptive threshold values;
   a detection processor that detects motion based upon combinations of the comparisons when the factors exceed the threshold value; and
   a spatio-temporally filtering processor that filters non-motion macroblocks of inside portions of moving objects where edges of the moving objects including moving macroblocks, that for each non-motion macroblock computes a neighborhood score defined by the number of motion macroblocks present in its 8-connected neighborhood, that identifies all the non-motion macroblocks which have at least 4 motion macroblocks in its 8-connected neighborhood and marks the non-motion macroblocks as motion macroblocks, that identifies all the non-motion macroblocks when have neighborhood scores of 3 and for such macroblocks retrieves their neighborhood score in a previous two frames, marking all macroblocks as motion macroblocks which have a neighborhood score of at least 5 in both previous frames and that detects motion by comparing the neighbor score of the motion macroblocks with a neighbor score threshold value of the computed corresponding adaptive threshold values.

9. The apparatus as in claim 8 wherein the computing processor that computes the bit size ratio further comprises a frame processor that provides a size value for each i-frame macroblock in two successive i-frames of the parsed stream and a size value of each p-frame macroblock corresponding to each i-frame macroblock of the two successive i-frames.

10. The apparatus as in claim 9 wherein computing processor that computes the bit size ratio further comprises a ratio processor that determines a ratio between each i-frame macroblock and corresponding p-frame macroblock.

11. The apparatus as in claim 10 wherein the comparing processor that compares the factors derived from the macroblock size information with the corresponding adaptive threshold values further comprises a processor that compares the determined ratios with a ratio threshold value of the computed corresponding adaptive threshold values.

12. The apparatus as in claim 11 wherein detecting processor that detects motion based upon combinations of the comparisons when the factors exceed the threshold value further comprises a processor that detects motion when at least one of the computed ratios exceeds the ratio threshold value.

13. The apparatus as in claim 8 further comprising one or more processors that use only the normalized bit size for detecting motion when intra-predictive i-frame macroblocks of the parsed stream are substantially free of AC components.

14. The apparatus as in claim 8 wherein the detecting processor that detects motion based upon combinations of the comparisons when the factors exceed the threshold value further comprises a p-frame processor that comparing a current p-frame macroblock bit size with a bit threshold value and that detects motion when the current p-frame macroblock bit size exceeds a bit threshold value of the computed corresponding adaptive threshold values.

\* \* \* \* \*